(12) United States Patent
Fenton

(10) Patent No.: US 7,885,317 B2
(45) Date of Patent: Feb. 8, 2011

(54) ALTBOC RECEIVER

(75) Inventor: Patrick C. Fenton, Calgary (CA)

(73) Assignee: NovAtel' Inc., Calgary, Alberta (CA)

( * ) Notice: Subject to any disclaimer, the term of this patent is extended or adjusted under 35 U.S.C. 154(b) by 748 days.

(21) Appl. No.: 11/756,744

(22) Filed: Jun. 1, 2007

(65) Prior Publication Data

US 2008/0094280 A1 Apr. 24, 2008

Related U.S. Application Data

(60) Provisional application No. 60/855,019, filed on Oct. 27, 2006, provisional application No. 60/810,121, filed on Jun. 1, 2006.

(51) Int. Cl.
*H04B 1/00* (2006.01)
(52) U.S. Cl. .................................. 375/147
(58) Field of Classification Search ........... 375/147, 375/149–150; 342/357.06, 357.08, 357.12
See application file for complete search history.

(56) References Cited

U.S. PATENT DOCUMENTS

| | | | |
|---|---|---|---|
| 6,195,328 B1* | 2/2001 | Tsui et al. ................ | 370/210 |
| 6,744,404 B1* | 6/2004 | Whitehead et al. ..... | 342/357.12 |
| 6,901,265 B2 | 5/2005 | Pratt | |
| 6,922,167 B2 | 7/2005 | Gerein | |
| 2004/0071200 A1* | 4/2004 | Betz et al. ................ | 375/152 |
| 2004/0208236 A1* | 10/2004 | Fenton ..................... | 375/148 |
| 2005/0012664 A1* | 1/2005 | Gerein ..................... | 342/361 |
| 2006/0215739 A1* | 9/2006 | Williamson et al. ..... | 375/149 |
| 2007/0064776 A1* | 3/2007 | Feller et al. .............. | 375/149 |
| 2007/0258511 A1* | 11/2007 | Knight et al. ............ | 375/149 |

FOREIGN PATENT DOCUMENTS

| | | |
|---|---|---|
| EP | 0830759 B1 | 9/2002 |
| WO | WO 2006/027004 A1 | 3/2006 |

OTHER PUBLICATIONS

L. Ries, et al., "New Investigations on Wide Band GNSS2 Signals", Proceedings of European Navigation Conference, GNSS, Graz, Austria, Apr. 2003.

(Continued)

*Primary Examiner*—Khanh C Tran
(74) *Attorney, Agent, or Firm*—Cesari and McKenna, LLP; Patricia A. Sheehan

(57) ABSTRACT

An AltBoc receiver accumulates power measurements over code chip ranges that are associated with time slots that span the code chips. The receiver combines a received signal with code and carrier phase offsets that correspond to the time slots to produce the power measurements, with the code phase offsets determined from compressed signals representing one or a combination of the codes in the AltBoc signal. The receiver recovers navigation data from the data channels of the received signal and combines the recovered data with the corresponding locally generated PRN codes to produce a locally generated 4 code signal that is then used track the full 8PSK AltBoc received signal. The receiver rotates and shifts the phase of the received signal in order to line up the subcarrier splitting code zero crossings. The pulse shape of this rotated and shifted signal is measured. The resulting sharp edges of the recovered subcarrier are used to control the code phase of the receiver.

27 Claims, 24 Drawing Sheets

OTHER PUBLICATIONS

L, Ries, et al., "A Software Simulation Tool for GNSS2 BOC Signals Analysis", Proceedings of the Institute of Navigation, GPS, Sep. 2002.

J.M. Sleewaegen, et al., "Galileo AltBOC Receiver", ENC-GNSS, May 17, 2004, Rotterdam.

Sleewaegen et al., "Galileo AltBOC Receiver", Septentrio NV, Belgium; ESA-ESTEC, The Netherlands, ENC-GNSS, 17 May 2005, pp. 1-9.

Marradi L et al: "The Galileo Ground Segment Reference Receiver Development: Architecture and Critical Design Issues" Proceedings of ION GPS/GNSS, XX, Portalnd OR, Sep. 9, 2003, pp. 1929-1940.

* cited by examiner

| INDEX | C*0 | C*1 | C2 | C3 | T0 | T1 | T2 | T3 | T4 | T5 | T6 | T7 | MMTp | MMToff |
|---|---|---|---|---|---|---|---|---|---|---|---|---|---|---|
| 0 | 1 | 1 | 1 | 1 | 1 | 1 | 5 | 5 | 5 | 5 | 1 | 1 | 1 | 2 |
| 1 | 1 | 1 | 1 | -1 | 8 | 8 | 8 | 4 | 4 | 4 | 4 | 8 | 8 | 1 |
| 2 | 1 | 1 | -1 | 1 | 8 | 4 | 4 | 4 | 4 | 8 | 8 | 8 | 8 | 3 |
| 3 | 1 | 1 | -1 | -1 | 7 | 7 | 3 | 3 | 3 | 3 | 7 | 7 | 7 | 2 |
| 4 | 1 | -1 | 1 | 1 | 2 | 6 | 6 | 6 | 6 | 2 | 2 | 2 | 2 | 3 |
| 5 | 1 | -1 | 1 | -1 | 7 | 7 | 7 | 7 | 3 | 3 | 3 | 3 | 7 | 0 |
| 6 | 1 | -1 | -1 | 1 | 5 | 5 | 5 | 5 | 1 | 1 | 1 | 1 | 5 | 0 |
| 7 | 1 | -1 | -1 | -1 | 6 | 6 | 6 | 2 | 2 | 2 | 2 | 6 | 6 | 1 |
| 8 | -1 | 1 | 1 | 1 | 2 | 2 | 2 | 6 | 6 | 6 | 6 | 2 | 2 | 1 |
| 9 | -1 | 1 | 1 | -1 | 1 | 1 | 1 | 1 | 5 | 5 | 5 | 5 | 1 | 0 |
| 10 | -1 | 1 | -1 | 1 | 3 | 3 | 3 | 3 | 7 | 7 | 7 | 7 | 3 | 0 |
| 11 | -1 | 1 | -1 | -1 | 6 | 2 | 2 | 2 | 2 | 6 | 6 | 6 | 6 | 3 |
| 12 | -1 | -1 | 1 | 1 | 3 | 3 | 7 | 7 | 7 | 7 | 3 | 3 | 3 | 2 |
| 13 | -1 | -1 | 1 | -1 | 8 | 8 | 8 | 8 | 4 | 4 | 4 | 4 | 4 | 3 |
| 14 | -1 | -1 | -1 | 1 | 4 | 4 | 4 | 8 | 8 | 8 | 8 | 4 | 4 | 1 |
| 15 | -1 | -1 | -1 | -1 | 5 | 5 | 1 | 1 | 1 | 1 | 5 | 5 | 5 | 2 |

FIG. 1

PRIOR ART

| INDEX | C*0 | C*1 | C2 | C3 | T0 | T1 | T2 | T3 | T4 | T5 | T6 | T7 | T8 | T9 | T10 | T11 | ANGLE | OFFSET |
|---|---|---|---|---|---|---|---|---|---|---|---|---|---|---|---|---|---|---|
| 0 | 1 | 1 | 1 | 1 | 1 | 1 | 5 | 5 | 5 | 5 | 1 | 1 | 1 | 1 | 5 | 5 | 1 | 2 |
| 1 | 1 | 1 | 1 | -1 | 8 | 8 | 8 | 4 | 4 | 4 | 4 | 8 | 8 | 8 | 8 | 4 | 8 | 1 |
| 2 | 1 | 1 | -1 | 1 | 8 | 4 | 4 | 4 | 4 | 8 | 8 | 8 | 8 | 4 | 4 | 4 | 8 | 3 |
| 3 | 1 | 1 | -1 | -1 | 7 | 7 | 3 | 3 | 3 | 3 | 7 | 7 | 7 | 7 | 3 | 3 | 7 | 2 |
| 4 | 1 | -1 | 1 | 1 | 2 | 6 | 6 | 6 | 6 | 2 | 2 | 2 | 2 | 6 | 6 | 6 | 2 | 3 |
| 5 | 1 | -1 | 1 | -1 | 7 | 7 | 7 | 3 | 3 | 3 | 3 | 3 | 7 | 7 | 7 | 7 | 7 | 0 |
| 6 | 1 | -1 | -1 | 1 | 5 | 5 | 5 | 5 | 1 | 1 | 1 | 1 | 5 | 5 | 5 | 5 | 5 | 0 |
| 7 | 1 | -1 | -1 | -1 | 6 | 6 | 6 | 2 | 2 | 2 | 2 | 6 | 6 | 6 | 6 | 2 | 6 | 1 |
| 8 | -1 | 1 | 1 | 1 | 2 | 2 | 2 | 6 | 6 | 6 | 6 | 2 | 2 | 2 | 2 | 6 | 2 | 1 |
| 9 | -1 | 1 | 1 | -1 | 1 | 1 | 1 | 1 | 5 | 5 | 5 | 5 | 1 | 1 | 1 | 1 | 1 | 0 |
| 10 | -1 | 1 | -1 | 1 | 3 | 3 | 3 | 3 | 7 | 7 | 7 | 7 | 3 | 3 | 3 | 3 | 3 | 0 |
| 11 | -1 | 1 | -1 | -1 | 6 | 2 | 2 | 2 | 2 | 6 | 6 | 6 | 6 | 2 | 2 | 2 | 6 | 3 |
| 12 | -1 | -1 | 1 | 1 | 3 | 3 | 7 | 7 | 7 | 7 | 3 | 3 | 3 | 3 | 7 | 7 | 3 | 2 |
| 13 | -1 | -1 | 1 | -1 | 4 | 8 | 8 | 8 | 8 | 4 | 4 | 4 | 4 | 8 | 8 | 8 | 4 | 3 |
| 14 | -1 | -1 | -1 | 1 | 4 | 4 | 4 | 8 | 8 | 8 | 8 | 4 | 4 | 4 | 4 | 8 | 4 | 1 |
| 15 | -1 | -1 | -1 | -1 | 5 | 5 | 1 | 1 | 1 | 1 | 5 | 5 | 5 | 5 | 1 | 1 | 5 | 2 |

FIG. 4

|       | T0 | T1 | T2 | T3 | T4 | T5 | T6 | T7 | T8 | T9 | T10 | T11 |
|-------|----|----|----|----|----|----|----|----|----|----|-----|-----|
| CE5a-I | 8 | 7 | 6 | 5 | 4 | 3 | 2 | 1 | 8 | 7 | 6 | 5 |
| CE5b-I | 1 | 2 | 3 | 4 | 5 | 6 | 7 | 8 | 1 | 2 | 3 | 4 |
| CE5a-Q | 2 | 1 | 8 | 7 | 6 | 5 | 4 | 3 | 2 | 1 | 8 | 7 |
| CE5b-Q | 3 | 4 | 5 | 6 | 7 | 8 | 1 | 2 | 3 | 4 | 5 | 6 |

FIG. 7

| E5a-I | CHIP ISB | Code Phase | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 0 | 315 | 270 | 225 | 180 | 135 | 90 | 45 | 0 | 315 | 270 | 225 |
| 1 | 1 | 180 | 135 | 90 | 45 | 0 | 315 | 270 | 225 | 180 | 135 | 90 | 45 |
| -1 | 0 | 180 | 135 | 90 | 45 | 0 | 315 | 270 | 225 | 180 | 135 | 90 | 45 |
| -1 | 1 | 0 | 315 | 270 | 225 | 180 | 135 | 90 | 45 | 0 | 315 | 270 | 225 |

FIG. 8A

| E5a-Q | CHIP ISB | Code Phase | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 90 | 45 | 0 | 315 | 270 | 225 | 180 | 135 | 90 | 45 | 0 | 315 |
| 1 | 1 | 270 | 225 | 180 | 135 | 90 | 45 | 0 | 315 | 270 | 225 | 180 | 135 |
| -1 | 0 | 270 | 225 | 180 | 135 | 90 | 45 | 0 | 315 | 270 | 225 | 180 | 135 |
| -1 | 1 | 90 | 45 | 0 | 315 | 270 | 225 | 180 | 135 | 90 | 45 | 0 | 315 |

FIG. 8B

| E5b-I | CHIP ISB | Code Phase | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 45 | 90 | 135 | 180 | 225 | 270 | 315 | 0 | 45 | 90 | 135 | 180 |
| 1 | 1 | 225 | 270 | 315 | 0 | 45 | 90 | 135 | 180 | 225 | 270 | 315 | 0 |
| -1 | 0 | 225 | 270 | 315 | 0 | 45 | 90 | 135 | 180 | 225 | 270 | 315 | 0 |
| -1 | 1 | 45 | 90 | 135 | 180 | 225 | 270 | 315 | 0 | 45 | 90 | 135 | 180 |

FIG. 8C

| E5b-Q | CHIP ISB | Code Phase | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 135 | 180 | 225 | 270 | 315 | 0 | 45 | 90 | 135 | 180 | 225 | 270 |
| 1 | 1 | 315 | 0 | 45 | 90 | 135 | 180 | 225 | 270 | 315 | 0 | 45 | 90 |
| -1 | 0 | 315 | 0 | 45 | 90 | 135 | 180 | 225 | 270 | 315 | 0 | 45 | 90 |
| -1 | 1 | 135 | 180 | 225 | 270 | 315 | 0 | 45 | 90 | 135 | 180 | 225 | 270 |

FIG. 8D

| INDEX | CE5a-Q | CE5b-Q | T0 | T1 | T2 | T3 | T4 | T5 | T6 | T7 | ANGLE | OFFSET |
|---|---|---|---|---|---|---|---|---|---|---|---|---|
| 0 | 1 | 1 | 2 | 2 | 6 | 6 | 6 | 6 | 2 | 2 | 2 | 2 |
| 1 | 1 | -1 | 8 | 8 | 8 | 8 | 4 | 4 | 4 | 4 | 8 | 0 |
| 2 | -1 | 1 | 4 | 4 | 4 | 4 | 8 | 8 | 8 | 8 | 4 | 0 |
| 3 | -1 | -1 | 6 | 6 | 2 | 2 | 2 | 2 | 6 | 6 | 6 | 2 |

FIG. 9A

| CE5a-Q | CE5b-Q | CHIP ISB | Code Phase | | | | | | | | | | | |
|---|---|---|---|---|---|---|---|---|---|---|---|---|---|---|
| | | | 0/12 | 1/12 | 2/12 | 3/12 | 4/12 | 5/12 | 6/12 | 7/12 | 8/12 | 9/12 | 10/12 | 11/12 |
| 1 | 1 | 0 | 90 | 90 | 270 | 270 | 270 | 270 | 90 | 90 | 90 | 90 | 270 | 270 |
| 1 | -1 | 0 | 0 | 0 | 0 | 0 | 180 | 180 | 180 | 180 | 0 | 0 | 0 | 0 |
| -1 | 1 | 0 | 180 | 180 | 180 | 180 | 0 | 0 | 0 | 0 | 180 | 180 | 180 | 180 |
| -1 | -1 | 0 | 270 | 270 | 90 | 90 | 90 | 90 | 270 | 270 | 270 | 270 | 90 | 90 |
| 1 | 1 | 1 | 270 | 270 | 90 | 90 | 90 | 90 | 270 | 270 | 270 | 270 | 90 | 90 |
| 1 | -1 | 1 | 180 | 180 | 180 | 180 | 0 | 0 | 0 | 0 | 180 | 180 | 180 | 180 |
| -1 | 1 | 1 | 0 | 0 | 0 | 0 | 180 | 180 | 180 | 180 | 0 | 0 | 0 | 0 |
| -1 | -1 | 1 | 90 | 90 | 270 | 270 | 270 | 270 | 90 | 90 | 90 | 90 | 270 | 270 |

FIG. 9B

| CE5a-Q | CE5b-Q | CHIP ISB | ANGLE | OFFSET |
|---|---|---|---|---|
| 1 | 1 | 0 | 90 | 2/12 |
| 1 | -1 | 0 | 0 | 0 |
| -1 | 1 | 0 | 180 | 0 |
| -1 | -1 | 0 | 270 | 2/12 |
| 1 | 1 | 1 | 270 | 2/12 |
| 1 | -1 | 1 | 180 | 0 |
| -1 | 1 | 1 | 0 | 0 |
| -1 | -1 | 1 | 90 | 2/12 |

FIG. 10A

| CE5a-I | CHIP ISB | Code Phase | | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 337.5 | 292.5 | 247.5 | 202.5 | 157.5 | 112.5 | 67.5 | 22.5 | 337.5 | 292.5 | 247.5 | 202.5 |
| 1 | 1 | 157.5 | 112.5 | 67.5 | 22.5 | 337.5 | 292.5 | 247.5 | 202.5 | 157.5 | 112.5 | 67.5 | 22.5 |
| -1 | 0 | 157.5 | 112.5 | 67.5 | 22.5 | 337.5 | 292.5 | 247.5 | 202.5 | 157.5 | 112.5 | 67.5 | 22.5 |
| -1 | 1 | 337.5 | 292.5 | 247.5 | 202.5 | 157.5 | 112.5 | 67.5 | 22.5 | 337.5 | 292.5 | 247.5 | 202.5 |

| CE5b-I | CHIP ISB | Code Phase | | | | | | | | | | | | |
|---|---|---|---|---|---|---|---|---|---|---|---|---|---|
| | | 0/12 | 1/12 | 2/12 | 3/12 | 4/12 | 5/12 | 6/12 | 7/12 | 8/12 | 9/12 | 10/12 | 11/12 |
| 1 | 0 | 22.5 | 67.5 | 112.5 | 157.5 | 202.5 | 247.5 | 292.5 | 337.5 | 22.5 | 67.5 | 112.5 | 157.5 |
| 1 | 1 | 202.5 | 247.5 | 292.5 | 337.5 | 22.5 | 67.5 | 112.5 | 157.5 | 202.5 | 247.5 | 292.5 | 337.5 |
| -1 | 0 | 202.5 | 247.5 | 292.5 | 337.5 | 22.5 | 67.5 | 112.5 | 157.5 | 202.5 | 247.5 | 292.5 | 337.5 |
| -1 | 1 | 22.5 | 67.5 | 112.5 | 157.5 | 202.5 | 247.5 | 292.5 | 337.5 | 22.5 | 67.5 | 112.5 | 157.5 |

FIG. 12A

| INDEX | EVEN/ODD | C*0 | C*1 | C*2 | C*3 | T0 | T1 | T2 | T3 | T4 | T5 | T6 | T7 | T8 | T9 | T10 | T11 |
|---|---|---|---|---|---|---|---|---|---|---|---|---|---|---|---|---|---|
| 0 | 0 | 1 | 1 | 1 | 1 | 45 | 45 | 225 | 225 | 225 | 225 | 45 | 45 | 45 | 45 | 225 | 225 |
| 1 | 0 | 1 | 1 | 1 | 1 | 0 | 0 | 0 | 180 | 180 | 180 | 180 | 0 | 0 | 0 | 0 | 180 |
| 2 | 0 | 1 | 1 | 1 | 1 | 0 | 180 | 180 | 180 | 180 | 0 | 0 | 0 | 0 | 180 | 180 | 180 |
| 3 | 0 | 1 | 1 | -1 | 1 | 315 | 315 | 135 | 135 | 135 | 135 | 315 | 315 | 315 | 315 | 135 | 135 |
| 4 | 0 | 1 | 1 | 1 | 1 | 90 | 270 | 270 | 270 | 270 | 90 | 90 | 90 | 90 | 270 | 270 | 270 |
| 5 | 0 | 1 | 1 | 1 | 1 | 315 | 315 | 315 | 315 | 135 | 135 | 135 | 135 | 315 | 315 | 315 | 315 |
| 6 | 0 | 1 | 1 | 1 | 1 | 225 | 225 | 225 | 225 | 45 | 45 | 45 | 45 | 225 | 225 | 225 | 225 |
| 7 | 0 | 1 | 1 | 1 | 1 | 270 | 270 | 270 | 270 | 90 | 90 | 90 | 90 | 270 | 270 | 270 | 270 |
| 8 | 0 | 1 | 1 | 1 | 1 | 90 | 90 | 90 | 90 | 270 | 270 | 270 | 270 | 90 | 90 | 90 | 90 |
| 9 | 0 | 1 | 1 | 1 | 1 | 45 | 45 | 45 | 45 | 225 | 225 | 225 | 225 | 45 | 45 | 45 | 45 |
| 10 | 0 | 1 | 1 | 1 | 1 | 135 | 135 | 135 | 135 | 315 | 315 | 315 | 315 | 135 | 135 | 135 | 135 |
| 11 | 0 | 1 | 1 | 1 | 1 | 270 | 90 | 90 | 90 | 90 | 270 | 270 | 270 | 270 | 90 | 90 | 90 |
| 12 | 0 | 1 | 1 | 1 | 1 | 135 | 135 | 315 | 315 | 315 | 315 | 135 | 135 | 135 | 135 | 315 | 315 |
| 13 | 0 | -1 | 1 | 1 | 1 | 180 | 0 | 0 | 0 | 0 | 180 | 180 | 180 | 180 | 0 | 0 | 0 |
| 14 | 0 | -1 | 1 | 1 | 1 | 180 | 180 | 180 | 0 | 0 | 0 | 0 | 180 | 180 | 180 | 180 | 0 |
| 15 | 0 | -1 | 1 | 1 | 1 | 225 | 225 | 45 | 45 | 45 | 45 | 225 | 225 | 225 | 225 | 45 | 45 |
| 16 | 0 | -1 | 1 | 1 | 1 | 225 | 225 | 225 | 225 | 45 | 45 | 45 | 45 | 225 | 225 | 225 | 225 |
| 17 | 1 | -1 | 1 | 1 | 1 | 180 | 180 | 180 | 180 | 0 | 0 | 0 | 0 | 180 | 180 | 180 | 0 |
| 18 | 1 | -1 | 1 | 1 | 1 | 180 | 0 | 0 | 0 | 0 | 180 | 180 | 180 | 180 | 0 | 0 | 0 |
| 19 | 1 | -1 | 1 | 1 | 1 | 135 | 135 | 315 | 315 | 315 | 315 | 135 | 135 | 135 | 135 | 315 | 315 |
| 20 | 1 | 1 | 1 | 1 | 1 | 270 | 90 | 90 | 90 | 90 | 270 | 270 | 270 | 270 | 90 | 90 | 90 |
| 21 | 1 | 1 | 1 | 1 | 1 | 135 | 135 | 135 | 135 | 315 | 315 | 315 | 315 | 135 | 135 | 135 | 135 |
| 22 | 1 | 1 | 1 | 1 | 1 | 45 | 45 | 45 | 45 | 225 | 225 | 225 | 225 | 45 | 45 | 45 | 45 |
| 23 | 1 | 1 | 1 | 1 | 1 | 90 | 90 | 90 | 90 | 270 | 270 | 270 | 270 | 90 | 90 | 90 | 90 |
| 24 | 1 | 1 | 1 | 1 | 1 | 270 | 270 | 270 | 270 | 90 | 90 | 90 | 90 | 270 | 270 | 270 | 270 |
| 25 | 1 | 1 | 1 | 1 | 1 | 225 | 225 | 225 | 225 | 45 | 45 | 45 | 45 | 225 | 225 | 225 | 225 |
| 26 | 1 | 1 | 1 | 1 | 1 | 315 | 315 | 315 | 315 | 135 | 135 | 135 | 135 | 315 | 315 | 315 | 315 |
| 27 | 1 | 1 | 1 | 1 | 1 | 90 | 270 | 270 | 270 | 270 | 90 | 90 | 90 | 90 | 270 | 270 | 270 |
| 28 | 1 | -1 | 1 | -1 | 1 | 315 | 315 | 135 | 135 | 135 | 135 | 315 | 315 | 315 | 315 | 135 | 135 |
| 29 | 1 | -1 | -1 | -1 | -1 | 0 | 180 | 180 | 180 | 180 | 0 | 0 | 0 | 0 | 180 | 180 | 180 |
| 30 | 1 | -1 | -1 | -1 | -1 | 0 | 0 | 0 | 180 | 180 | 180 | 180 | 0 | 0 | 0 | 0 | 180 |
| 31 | 1 | -1 | -1 | -1 | -1 | 45 | 45 | 225 | 225 | 225 | 225 | 45 | 45 | 45 | 45 | 225 | 225 |

FIG. 13A

| CHIP ISB | CE5a-I | CE5b-I | CE5a-Q | CE5b-Q | ANGLE | OFFSET |
|---|---|---|---|---|---|---|
| 0 | 1 | 1 | 1 | 1 | 45 | 2/12 |
| 0 | 1 | 1 | 1 | -1 | 0 | 1/12 |
| 0 | 1 | 1 | -1 | 1 | 0 | 3/12 |
| 0 | 1 | 1 | -1 | -1 | 315 | 2/12 |
| 0 | 1 | -1 | 1 | 1 | 90 | 3/12 |
| 0 | 1 | -1 | 1 | -1 | 315 | 0/12 |
| 0 | 1 | -1 | -1 | 1 | 225 | 0/12 |
| 0 | 1 | -1 | -1 | -1 | 270 | 1/12 |
| 0 | -1 | 1 | 1 | 1 | 90 | 1/12 |
| 0 | -1 | 1 | 1 | -1 | 45 | 0/12 |
| 0 | -1 | 1 | -1 | 1 | 135 | 0/12 |
| 0 | -1 | 1 | -1 | -1 | 270 | 3/12 |
| 0 | -1 | -1 | 1 | 1 | 135 | 2/12 |
| 0 | -1 | -1 | 1 | -1 | 180 | 3/12 |
| 0 | -1 | -1 | -1 | 1 | 180 | 1/12 |
| 0 | -1 | -1 | -1 | -1 | 225 | 2/12 |
| 1 | 1 | 1 | 1 | 1 | 225 | 2/12 |
| 1 | 1 | 1 | 1 | -1 | 180 | 1/12 |
| 1 | 1 | 1 | -1 | 1 | 180 | 3/12 |
| 1 | 1 | 1 | -1 | -1 | 135 | 2/12 |
| 1 | 1 | -1 | 1 | 1 | 270 | 3/12 |
| 1 | 1 | -1 | 1 | -1 | 135 | 0/12 |
| 1 | 1 | -1 | -1 | 1 | 45 | 0/12 |
| 1 | 1 | -1 | -1 | -1 | 90 | 1/12 |
| 1 | -1 | 1 | 1 | 1 | 270 | 1/12 |
| 1 | -1 | 1 | 1 | -1 | 225 | 0/12 |
| 1 | -1 | 1 | -1 | 1 | 315 | 0/12 |
| 1 | -1 | 1 | -1 | -1 | 90 | 3/12 |
| 1 | -1 | -1 | 1 | 1 | 315 | 2/12 |
| 1 | -1 | -1 | 1 | -1 | 0 | 3/12 |
| 1 | -1 | -1 | -1 | 1 | 0 | 1/12 |
| 1 | -1 | -1 | -1 | -1 | 45 | 2/12 |

FIG. 14A

ALTBOC RECEIVER

CROSS-REFERENCE TO RELATED APPLICATIONS

The present application claims the benefit of U.S. Provisional Patent Application Ser. Nos. 60/810,121, filed on Jun. 1, 2006 and 60/855,019 filed on Oct. 27, 2006, by Patrick C. Fenton for a GALILEO ALTBOC CHANNEL DESIGN and is hereby incorporated by reference.

BACKGROUND OF THE INVENTION

1. Field of the Invention

This invention relates to a receiver that uses Galileo satellites in position determination. More particularly, it relates to a receiver that uses combinations or all of the codes in the AltBoc signals transmitted by these satellites to increase the precision of position determination by ground-based, airborne and seagoing receivers.

2. Background Information

The European Space Agency has designed and begun deployment of orbiting satellites to be used, inter alia, for position determination. The Galileo system is described in a number of publications, including Technical Annex to Galileo SRD Signal Plans, Draft 1, Jul. 18, 2001, ref # StF-annex SRD-2001/003 and the Galileo Open Service signal In Space Interface Control Document (OS SIS ICD) Draft 0 and later drafts published by the European Space Agency. However, a cursory review of the signal format for position determination will be of help in understanding the invention. The signals are generated in two adjacent frequency side bands, E5a and E5b. The E5a side band consists of a data-carrying channel modulated with a pseudorandom code (PRN) $C_0$ and a dataless pilot channel modulated with a pseudorandom code $C_2$. In effect, these two codes modulate a carrier whose frequency is 1176.45 MHz. The code $C_0$ modulates an in-phase version of the carrier and the code $C_2$ modulates a quadrature version.

The E5b signal consists of a data carrying channel modulated with a pseudorandom code $C_1$ and a pilot channel modulated with a pseudorandom code $C_3$. In effect, these two codes modulate a carrier whose frequency is 1207.4 MHz. The code $C_1$ modulates an in-phase version of the carrier and the code $C_3$ modulates a quadrature version. The data modulated on $C_1$ does not necessarily have the same bit rate as the data modulated on $C_0$, although the bit transitions coincide. The number of chips in each PRN, or spreading, code is 10,230 and each code is generated at a rate of $10.23 \times 10^6$ chips per second.

The modulation in each of the channels is by binary phase shift keying (BPSK). The four spreading codes $C_0 \ldots C_3$ are combined into an AltBoc signal i.e., a BOC (10, 15) signal designed as an 8PSK signal to maintain a constant output power. The carrier frequency of this signal is 1191.795 MHz, midway between the E5a and E5b carrier frequencies.

The data is modulated onto the $C_0$ and $C_1$ codes by multiplication, resulting in:

$$C_0^* = C_0 \times NAV_{E5a} \text{ and}$$

$$C_1^* = C_1 \times NAV_{E5b}$$

A subcarrier (or "splitting subcarrier code") in the form of a square wave, having a chip rate of 15 MHz (actually $15 \times 1.023 \times 10^6$), is mixed with the four codes in a unique way to form the AltBoc (10, 15) combined spreading code.

Specifically, the phase angles of an AltBoc 8PSK signal are generated in accordance with the lookup table shown in FIG. 1, as applied to the RF phase polar chart of FIG. 2. The chart has eight points, each of which indicates a carrier phase displaced by 45 degrees from its adjacent points. The inputs to the table are the pseudorandom codes ($C_0^*$, $C_1^*$, $C_2$, $C_3$). $T_0 \ldots T_7$ are time intervals, the duration of each interval being ⅛ of the period of the splitting subcarrier code, and thus, the table corresponds to one wavelength of the 15 MHz splitting subcarrier code. A code combination of, for example, ($C_0^*$, $C_1^*$, $C_2$, $C_3$)=(1, 1, 1, 1) produces an output of (1, 1, 5, 5, 5, 5, 1, 1) during the respective time intervals $T_0 \ldots T_7$, these values being the like-numbered points on the polar chart.

The angle (MMT p) and offset (MMToff) columns in FIG. 1 represent a condensed version of the columns [$T_0 \ldots T_7$]. The angle represents the starting point in the polar chart of FIG. 2 and the offset represents the splitting subcarrier code phase transition time from the center of the corresponding line in the table. For example, an angle of 1 and an offset of 2 (1,2) translates to a signal switching back and forth between points one and five (180 degrees) in FIG. 2, with the transition points at time at $T_2$ and $T_6$ yielding the series [1, 1, 5, 5, 5, 5, 1, 1]. Note that 4 time intervals are ½ wavelength of the 15 MHz splitting subcarrier code. The code is also sometimes referred to herein as "the splitting code."

Note also that the modulus of the 15 MHz splitting subcarrier code timing is used as a lookup index in FIG. 1. For example, the $T_S$ lookup index of range [0 . . . 7] to use at any time T will be $T_s = \text{INT}(T \ast 8 \ast 15 \times 1.023 \times 10^6) \text{ MOD } 8$. Sampling in this fashion accomplishes the splitting subcarrier code multiplication and results in bi-directional rotations of the spreading codes phases at a rate of 15 MHz. Where the $C_0$ and $C_1$ signals end up at 1176.45 MHz, offset −15.345 MHz from the AltBoc center frequency of 1191.795 MHz. Similarly, the $C_2$ and $C_3$ signals end up 15.345 MHz higher at 1207.14 MHz.

FIG. 3 is a simplified diagram of a circuit arrangement that might be used to generate the AltBoc signal transmitted from a satellite. As shown therein, the $C_0$ and $C_1$ inputs are multiplied by the respective NAV data signals and applied to an AltBoc lookup table (e.g. FIG. 1) along with the $C_2$ and $C_3$ inputs. The table converts the four inputs into the outputs reflected in the table, and these are applied to an 8PSK modulator 20 that shifts the phase of the output of a 1191.795 MHz carrier generator. The output of the modulator 20 is the AltBoc signal.

The receiver (not shown), operating in a known manner used, for example, by conventional GPS receivers, correlates incoming AltBoc signals with local code and carrier generators of either the E5a code or the E5b code. The correlation with, for example, the in-phase components of the E5a code recovers the NAV E5a data, while the E5a quadrature phase (pilot) components are used for phase tracking and pseudorange determination. Specifically, the I and Q E5a correlation outputs are combined in a feedback loop to align a locally generated code and carrier with the corresponding components of the E5a portion of incoming signal. The amount of phase shifting required to align the local codes to the received codes is used in a well known arrangement to calculate the pseudorange to the satellite.

The position determination obtained by the Galileo system is materially more precise than that of prior GPS C/A code receivers. This is partly due to the use of a higher chip rate in the spreading codes and the use of a greater bandwidth.

The present invention is directed to an improvement of the accuracy of the pseudorange determination.

SUMMARY OF THE INVENTION

In accordance with one aspect of the invention, a Galileo receiver uses a combination of the data codes or all four of the AltBoc E5 codes from a satellite to align locally generated replicas of the codes with the corresponding components in the incoming signal from the satellite. When all of the codes are used, the data in the data-carrying channels are recovered and the receiver then combines the data with the receiver generated $C_0 \ldots C_3$ codes to produce $C_0^*, C_1^*, C_2, C_3$. The receiver uses the results to track the full 8PSK AltBoc broadcast signal. In this way, the receiver recovers the full signal bandwidth, which results in a sharper transition in the correlation curve and a more accurate pseudorange. In other embodiments, the receiver utilizes the combination of the E5a and E5b I channel codes and/or the pilot codes to similar effect.

Preferably, though not necessarily, the receiver uses a different code alignment procedure from prior Galileo receivers. More specifically, the receiver reproduces the satellite signal using, twelve (or more or less), time intervals that span the length of the 10.023 MHz spreading code chip and uses lookup tables that represent compressed channel signals, combinations of compressed channel signals and/or combinations that include the 15 MHz splitting code. Also, in the preferred embodiment, a Multipath Mitigation Technique (MMT) is used to further increase the accuracy by more precisely determining the code and carrier phases of a direct path signal based on associated pulse shapes.

Preferably, the invention will be described specifically in relation to the use of the twelve time intervals. However, it is equally applicable to the use of the conventional eight intervals.

BRIEF DESCRIPTION OF THE DRAWINGS

The invention description below refers to the accompanying drawings, of which:

FIG. 1 is a lookup table indicating the phase angles of an AltBoc signal;

FIG. 4 is an AltBoc signal lookup table with twelve time slices to span the PRN spreading codes;

FIG. 7 is a table of phase angle rotations that can be used in isolating the individual codes from the AltBoc center frequency;

FIGS. 8A-D depicts in more detail a lookup table used in the circuitry of FIG. 8;

FIGS. 9A and 9B depict in more detail the contents of a lookup table of FIG. 10;

FIG. 10A depicts in more detail the contents of the lookup table of FIG. 10;

FIG. 12A depicts in more detail the contents of a look-up tables of FIG. 12;

FIG. 13A depicts in more detail a lookup table of FIG. 13; and

FIG. 14A depicts in more detail a lookup table of FIG. 14.

DETAILED DESCRIPTION OF AN ILLUSTRATIVE EMBODIMENT

Figure 2:
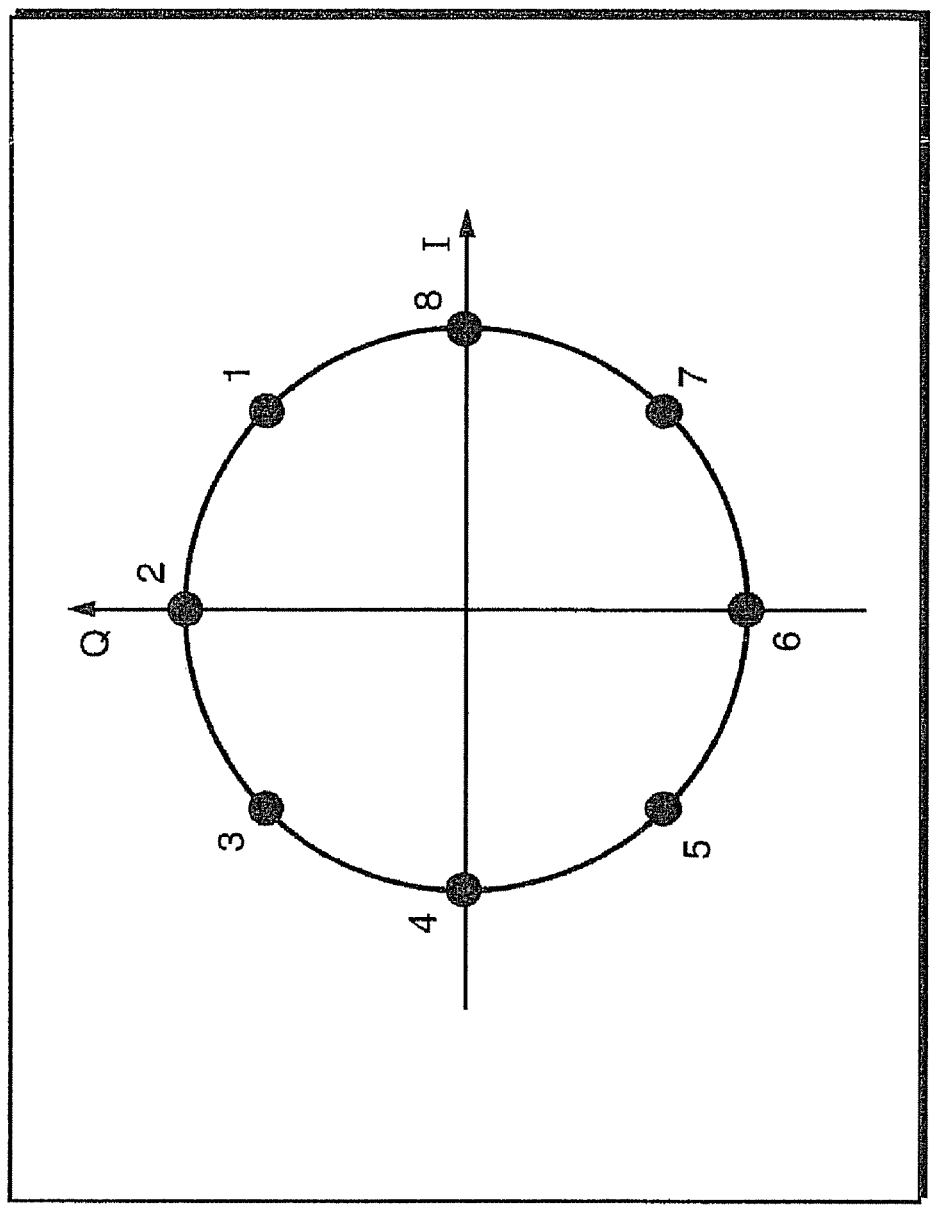
FIG. 2 is a polar chart to which the contents of the table of FIG. 1 are applied.
Figure 3:
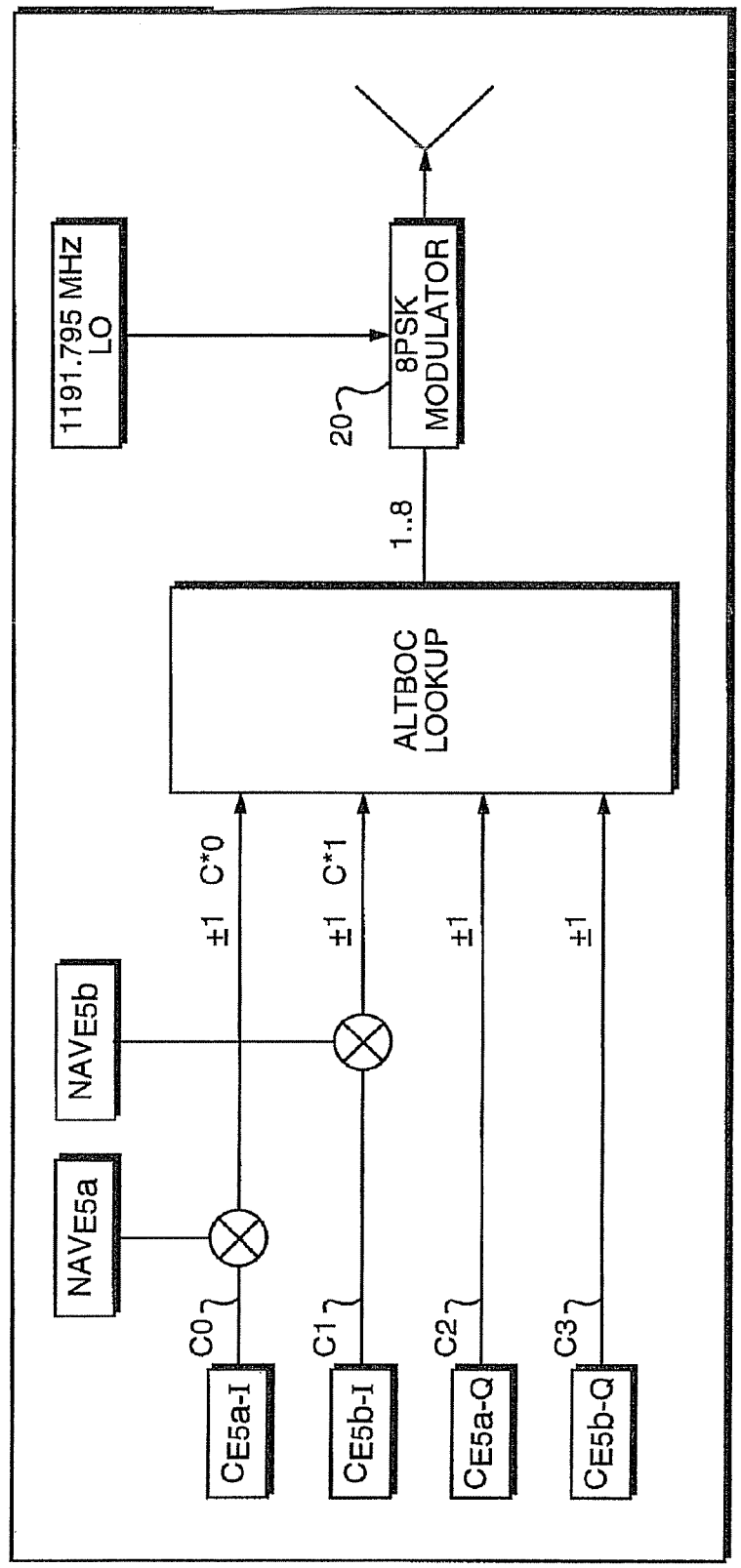
FIG. 3 is a simplified diagram of circuitry that might be used to generate the AltBoc signal transmitted from an orbiting satellite.
Figure 5A:
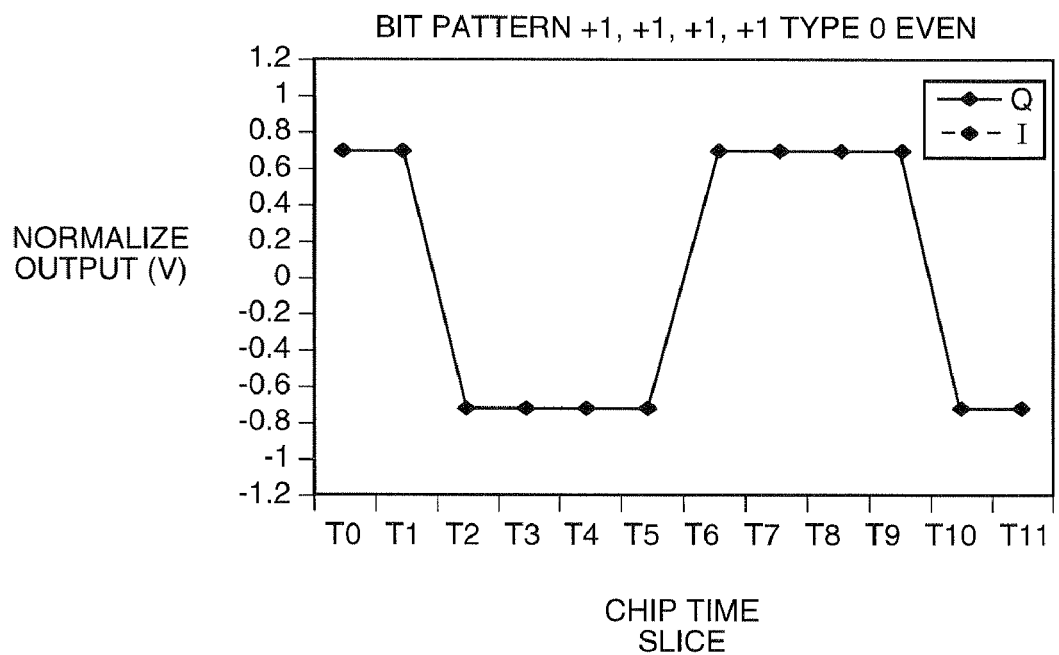
FIGS. 5A and B illustrate signals that correspond to an even and an odd chip of a spreading code.
Figure 5B:
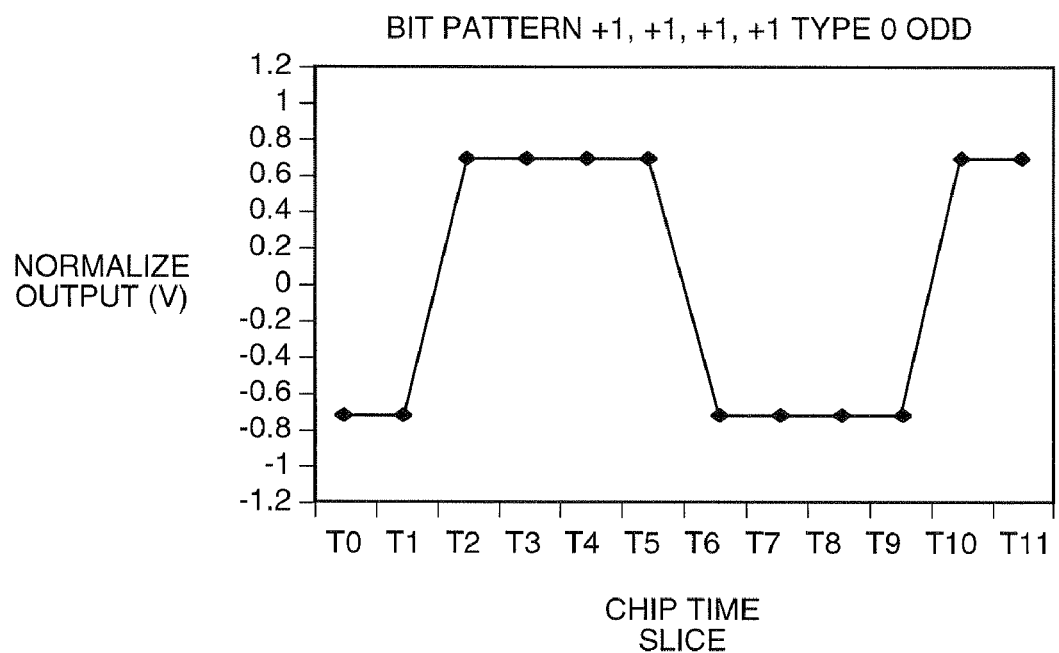

Referring now to FIG. 4, I have extended the AltBoc signal table to include twelve time segments, to span the length of the 10.023 MHz spreading code chips. Thus, each time segment is one-twelfth of a PRN code chip. To use the table, the phase angles must be shifted 180 degrees for the odd code chips, since the 15 MHz splitting code phase transitions are inverted on the odd chips. Note that the splitting code repeats its splitting pattern every 2 PRN code chips, and is continuous through the two chips, as illustrated in FIGS. 5A and 5B which depict even and odd "type 0" spreading code chips from the table of FIG. 4.

Figure 6A:
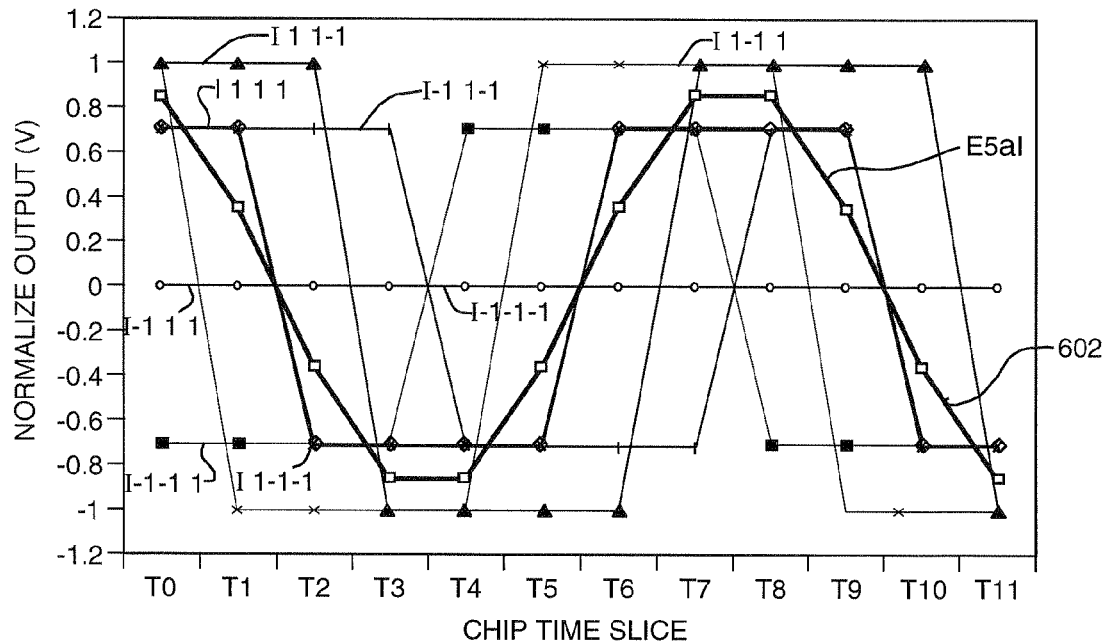
FIGS. 6A and B illustrate compressed signals for E5a I and E5a Q codes.
Figure 6B:
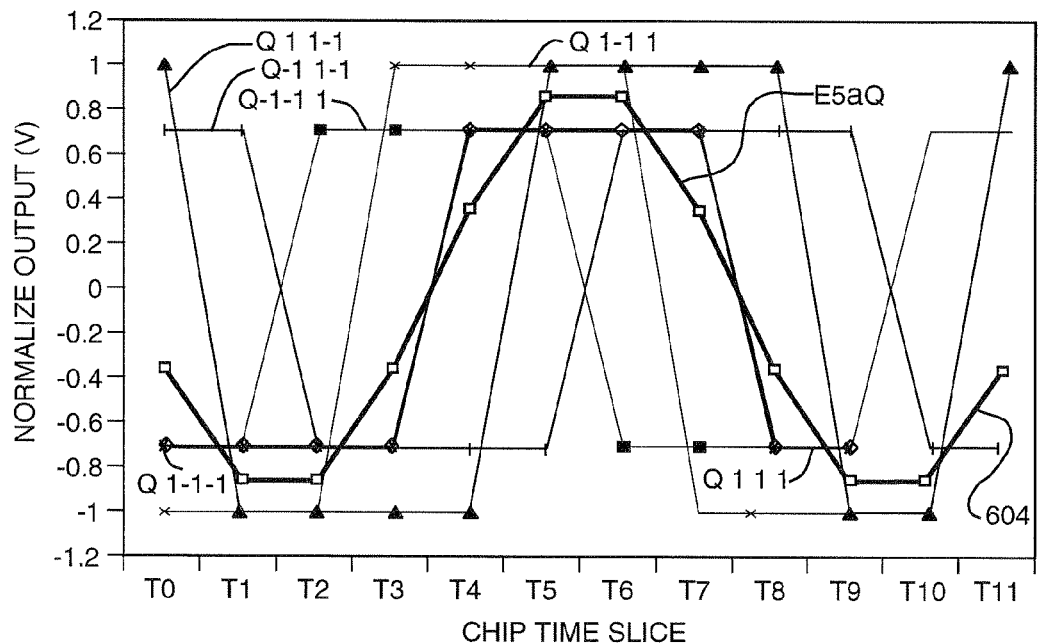

The AltBoc signal as represented by FIG. 4, for example, can be manipulated to generate signals to isolate individual spreading codes or subsets of the spreading codes. To generate a signal to isolate a given spreading code, the given code is held constant and the other codes are randomized. FIG. 6A illustrates all of the phase angles for all of the codes where $C_0=1$. Compressing the signals, that is, essentially taking an average of the randomized signals when $C_0=1$, the E5a I isolation signal can be represented approximately in the polar table format for times $T_0 \ldots T_{11}$ as [8, 7, 6, 5, 4, 3, 2, 1, 8, 7, 6, 5]. The compressed E5a I isolation signal is represented in FIG. 6A by line 602. FIG. 6B illustrates the compressed signal 604 that represents the isolation signal for E5a Q code. Note that the E5a isolation codes, that is, the $C_0$ and the $C_2$ codes, are rotating at −15 MHz.

Similarly, signals isolating the other codes, namely, the E5b I code and the E5b Q code, may be compressed in the same manner, to produce the approximate phase rotations listed in the table of FIG. 7.

Figure 8:
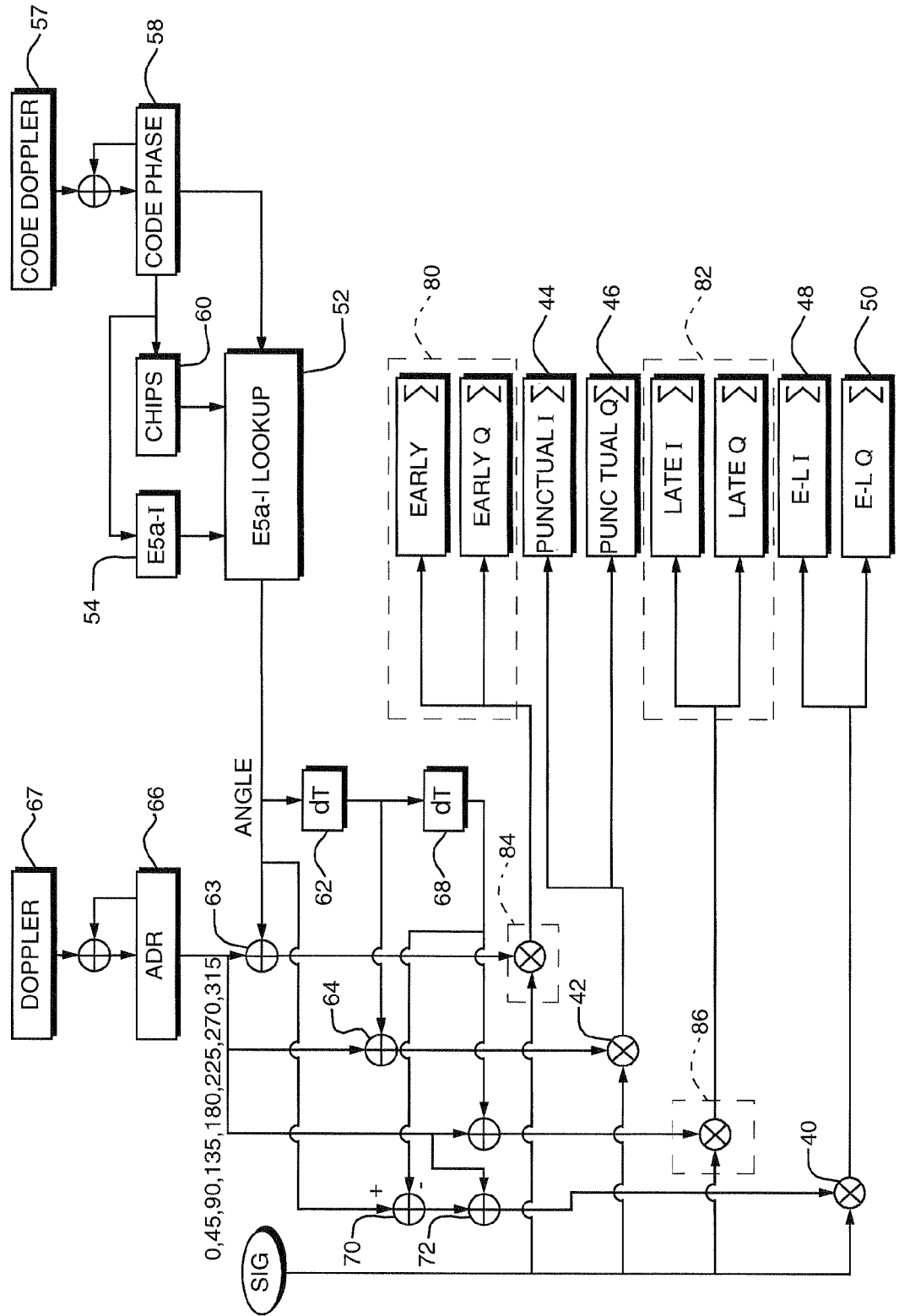
FIG. 8 is a simplified diagram of receiver circuitry for acquiring and tracking a single PRN code transmitted by a satellite.

Using the compressed signals, the codes in the four AltBoc channels can be tracked individually with circuitry that is similar to that of a GPS signal-tracking arrangement that is disclosed, for example, in U.S. Pat. Nos. 5,101,416; 5,390,207 and 5,495,499. Thus, as shown in FIG. 8, the incoming signal (SIG) (after down conversion to an immediate frequency in a known manner) is applied to a pair of complex correlators including complex multipliers 40 and 42 whose outputs are applied to punctual I and Q accumulators 44 and 46 and early-minus-late (E-L) I and Q accumulators 48 and 50.

Specifically, a lookup table 52 contains phase offsets that correspond with the entries in FIG. 7 for the appropriate code. For example, the table shown in FIG. 8A is used as the lookup table 52 to track the E5a I code. Accordingly, the $C_0$ code for a selected satellite is provided as one of the inputs to the table 52, by a PRN Code generator 54. A code Doppler register 57 contains a code phase rate whose output is accumulated in the code phase counter 58, to provide the code phase fractional offsets $T_0 \ldots T_{11}$. Each time the counter rolls over, it advances a chip counter 60 that identifies a next chip in the selected code. When the chip counter reaches the end of its count, in this case 10229, it rolls back to zero and sends a reset signal to the PRN code generator 52. The output of the counter 58 thus selects the time slots in the code chip identified by the chip counter 60. The code phase count, that is, the code chip time interval, is used also as an input to the lookup table.

Note that, with the use of twelve time intervals, there is also an input to the lookup table 52 that indicates an odd or even code chip. In the example, the least significant bit of the chip count is used as an input to the lookup table, as the indication of the chip being even or odd. The table thus contains four rows that correspond to the 15 MHz splitting subcarrier code changing polarity, i.e., making 180° phase reversals, at each chip of the spreading code. The code chip value and the code chip count together specify the selected row, and the code phase count specifies the column. The selection of phase angles from the table 52 largely removes the effect of the splitting sub-carrier code from the locally generated signal.

The code phase angles from the table 52 are summed in an adder 63 with the frequency phase angles from a carrier phase counter 66. The carrier phase counter 66 provides an accumulated Doppler range and instantaneous carrier phase angle, by summing the Doppler phase angles provided by a frequency Doppler register 67. The carrier phase angle is used to remove the effect of the Doppler effect from the received signal. The result of the summation is a locally generated code that is then mixed with the received signal to produce correlation measurements.

A punctual version of the code is produced as well as early and late and/or early minus late versions. In the example, early-minus-late and punctual versions are produced. Thus, the successive phase angles from the lookup table 52 are passed directly as early signals to an early-minus-late adder 70. The successive phase angles are also passed through a first delay 62 to produce the punctual signals and through a second delay 68 to produce late signals. The respective delayed signals are supplied to a punctual adder 64 and the early-minus late adder 70.

The punctual adder 64 sums the table output with the output of the phase counter 66, to produce the punctual version of the E5a I code. An adder 72 sums the early-minus-late signals produced by the adder 70 with the output of the phase counter 66, to produce the early-minus-late version of the code. The multiplier 42 multiplies together the punctual version of the local code with the received signal and the results are accumulated in the punctual I and Q accumulators 44 and 46. The multiplier 40 multiplies together the early-minus-late version of the local code with the received signal and the results are accumulated in E-L I and Q accumulators 48 and 50.

The drawing does not depict a conventional feedback arrangement whereby the contents of the complex accumulators E-L (48, 50) and punctual (44,46) are processed and the results used to adjust the code phase counter 58 and frequency phase counter 66, by applying rate modifications to the Code Doppler 57 and Doppler 67 registers, so as to acquire and track the E5a I code and carrier in the incoming signal. As desired, separate early I and Q signals and late I and Q signals may also be produced and multiplied together with the received signal and the results accumulated, as illustrated by the inclusion of early and late multipliers 84 and 86 and associated accumulators 80 and 82, which are depicted in dotted boxes in the drawing. The separate early and late data sets may be used, for example, to aid in the initial satellite acquisition process. Alternatively, or in addition, separate early and late signals may be accumulated and subtracted to produce the E-L signals, and accumulators 48 and 50 may be omitted.

The circuitry for the other three channels is the same as that of FIG. 8, except that the contents of the lookup table 52 are selected from the appropriate FIGS. 8B-D for the E5a Q, E5b I or E5b Q codes. Once the carrier and code Doppler values have been determined for any one of the channels, the values may be used in other channels to acquire the remaining codes, since the timing on all channels is close. Note that the respective channel isolation signals compress essentially to sine waves.

In an alternative arrangement, the carrier may instead be removed from the received signal in a separate multiplication operation that involves the received signal and the carrier phase count, with the output from the lookup table then combined with the result. Alternatively or in addition, the Doppler values may be offset by ±15 MHz, depending on the code, and the lookup table 52 could then be replaced by a processor that converts the PRN output code to angle outputs of 0 and 180 degrees.

Figure 9:
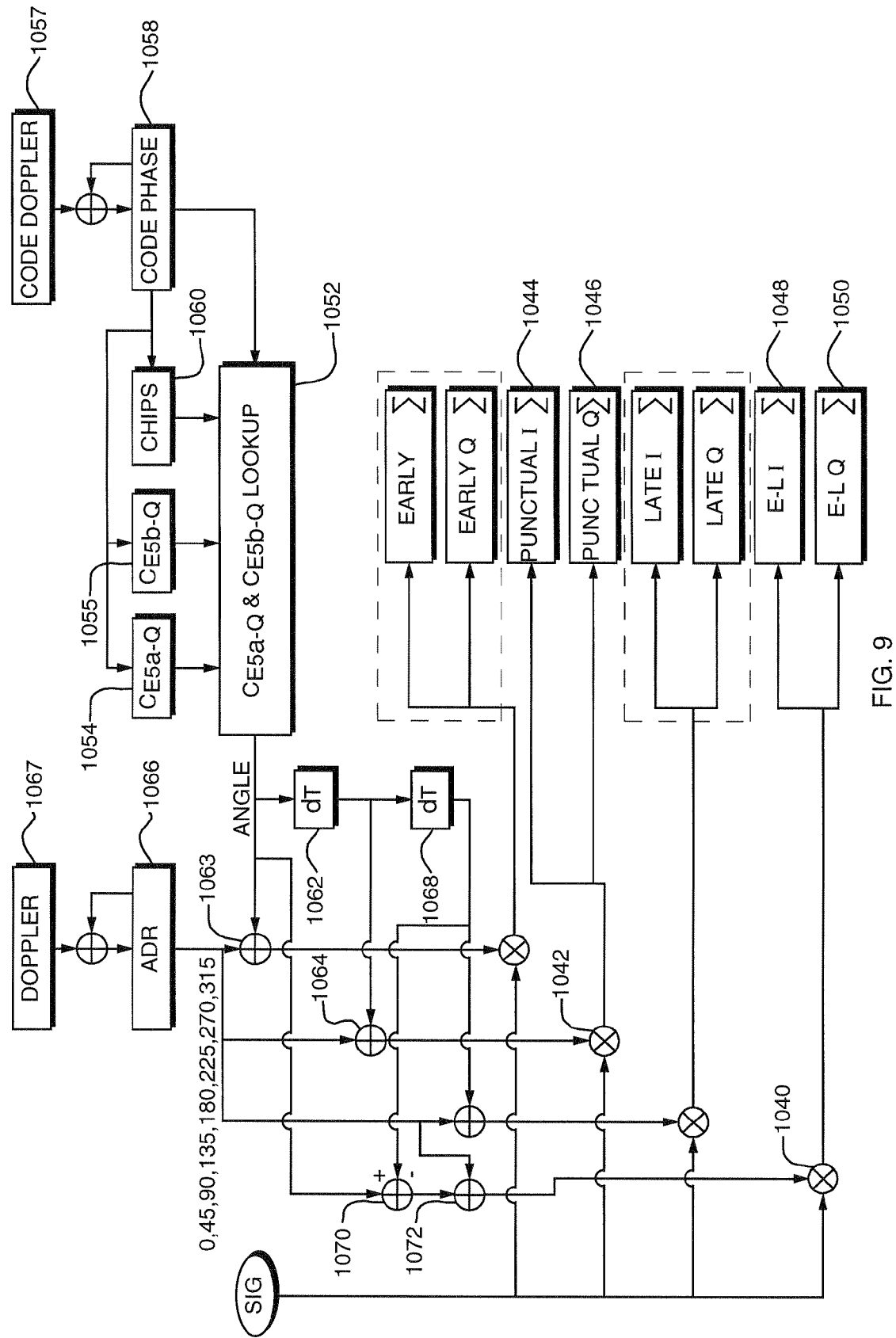
FIG. 9 is a diagram of an arrangement for the simultaneous tracking of two pilot codes.

FIG. 9 depicts a circuit for tracking a combination of the carrier, or pilot, channels using a combination of the associated compressed signals in lookup table 1052. FIG. 9A depicts the polar representations of the combined compressed pilot code signals and these signals, which span a chip of the 15 MHz splitting sub-carrier code, may be used directly or the table may be expanded to include offsets that span the PRN code chip, as discussed above. FIG. 9B depicts a code phase angle table that corresponds to the offsets that span a code chip of the compressed pilot code signals. In the example, the lookup table 1052 contains the table of FIG. 9B. The inputs to the table 1052 are the individual pilot codes from PRN code generators, or registers, 1054 and 1055, the chip count from register 1060, which indicates an odd or even chip count, and the code phase count from the code phase register 1058 to specify the time interval ($T_0 \ldots T_{11}$).

Figure 10:
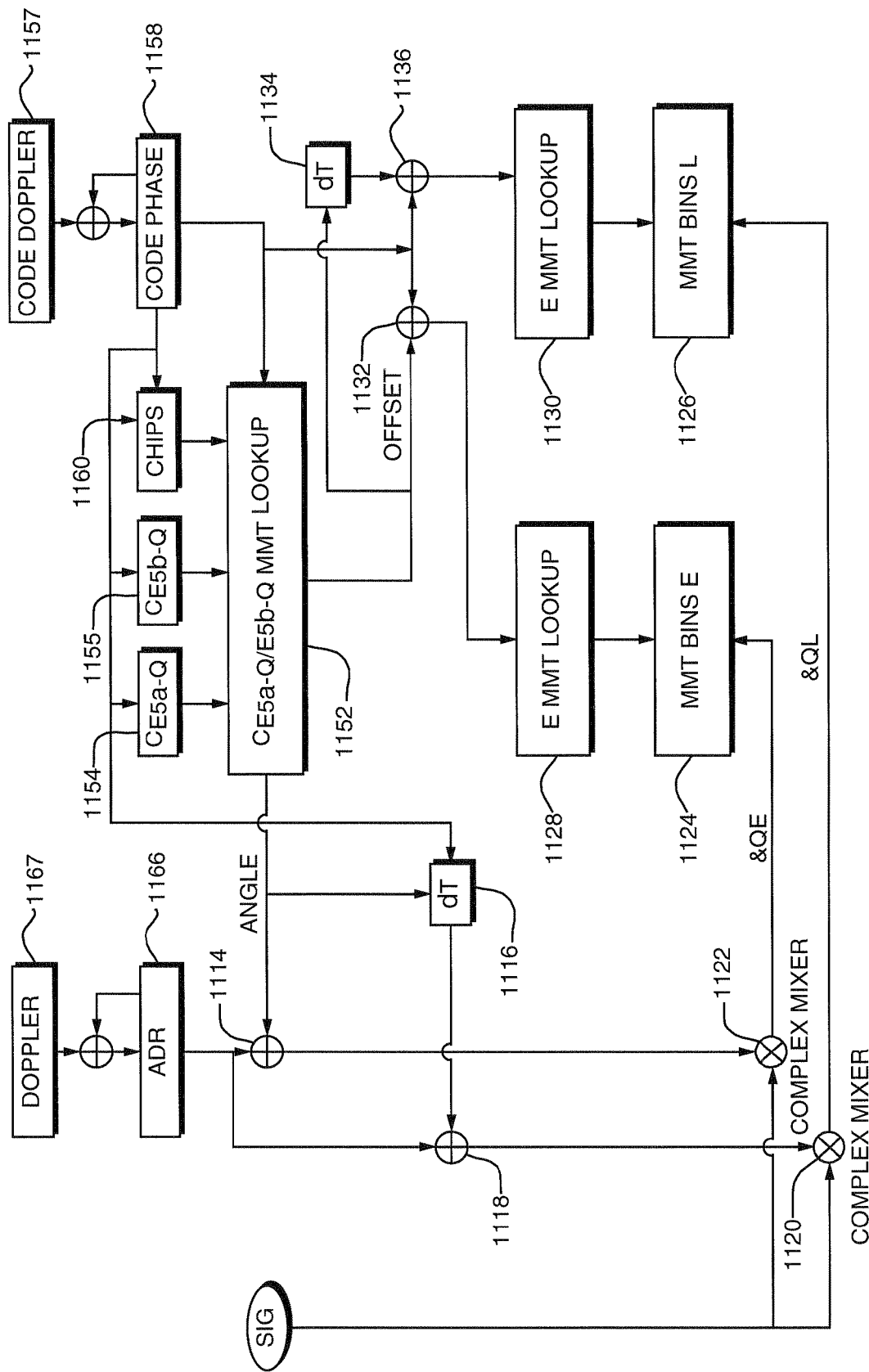
FIG. 10 is a diagram illustrating the application of a Multipath Mitigation Technique to a receiver tracking a combination of the two pilot codes.

FIG. 10 depicts a circuit for recovering the pulse shape of the combined carrier, or pilot, signals, and thus, an application of a Multipath Mitigation Technique (MMT) to the tracking of the combined pilot codes. FIG. 10A depicts the contents of a lookup table 1152. The lookup table 1152 includes angles and offsets that are used to rotate the signals into the I plane and align the transitions in the 15 MHz splitting sub-carrier code, respectively. The splitting code has regular 180° phase shifts, while the PRN code has random or irregular phase shifts. By expanding the tables to utilize offsets that span the PRN code chip, the phase shifts that do occur in the PRN codes all occur between $T_{-1}$ and $T_0$, and the PRN code phase shifts can thus be "stacked," to coincide with the 180° phase transitions in the 15 MHz splitting code. This stacking process results in noise reduction, producing a sharper transition that can be more accurately tracked.

While the original Galileo Interface Control Documents used the polar convention, I have chosen to use a degrees convention, to provide more flexibility and a more practical implementation. For example, some table entries are rotated 22.5 degrees to maximize power in the I plane, as is discussed also with reference to FIGS. 13A and 13B below.

The angle information from the lookup table is supplied to an adder 1114 and through a delay 1116 to an adder 1118, to sum with the instantaneous carrier angle provided by register 1166. The results are early and late signals that are then mixed with the received signal in complex mixers 1120 and 1122. The signals produced by the mixers are supplied to sets of early and late bins 1124 and 1126, respectively.

The offset values from the lookup table 1152 are supplied to an adder 1132 and through a delay 1134 to an adder 1136. The offset values are summed with the code phase count from the register 1158 and the results are supplied to early and late MMT decoders 1128 and 1130, respectively. The decoders control which of the bins in the respective early and late sets of bins accumulate the results of the mixing of the received signal and the locally generated signal. The bins correspond to locations or ranges of locations along a PRN code chip, and the accumulated signals are used to measure the pulse shape associated with the combined pilot codes. The MMT decoders and MMT bins operate in accordance with the decoders and bins described in United States Published Patent Application 2004/0208236, which is assigned to a common Assignee and incorporated herein in its entirety by reference.

The pulse shape is used in MMT processing to more accurately determine the timing of at least the direct path signal, as discussed in the incorporated application. Specifically, the MMT processing takes a series of power measurements that correspond to samples of incoming code chips so as to obtain the associated pulse shapes or at least the shapes that correspond to the leading edges of the code chips. The shapes are compared with the shapes that would be depicted in the absence of multipath distortion and, from the comparison, the timing of at least the direct path signal is determined. The timing is utilized in the code alignment process, to more accurately align the local code with the code of the direct path signal, and thus, increase the accuracy of the corresponding pseudo-ranges. The stacked signals, which have sharper transitions, allow for even more accuracy in determining the timing of at least the direct path signal.

Figure 11:
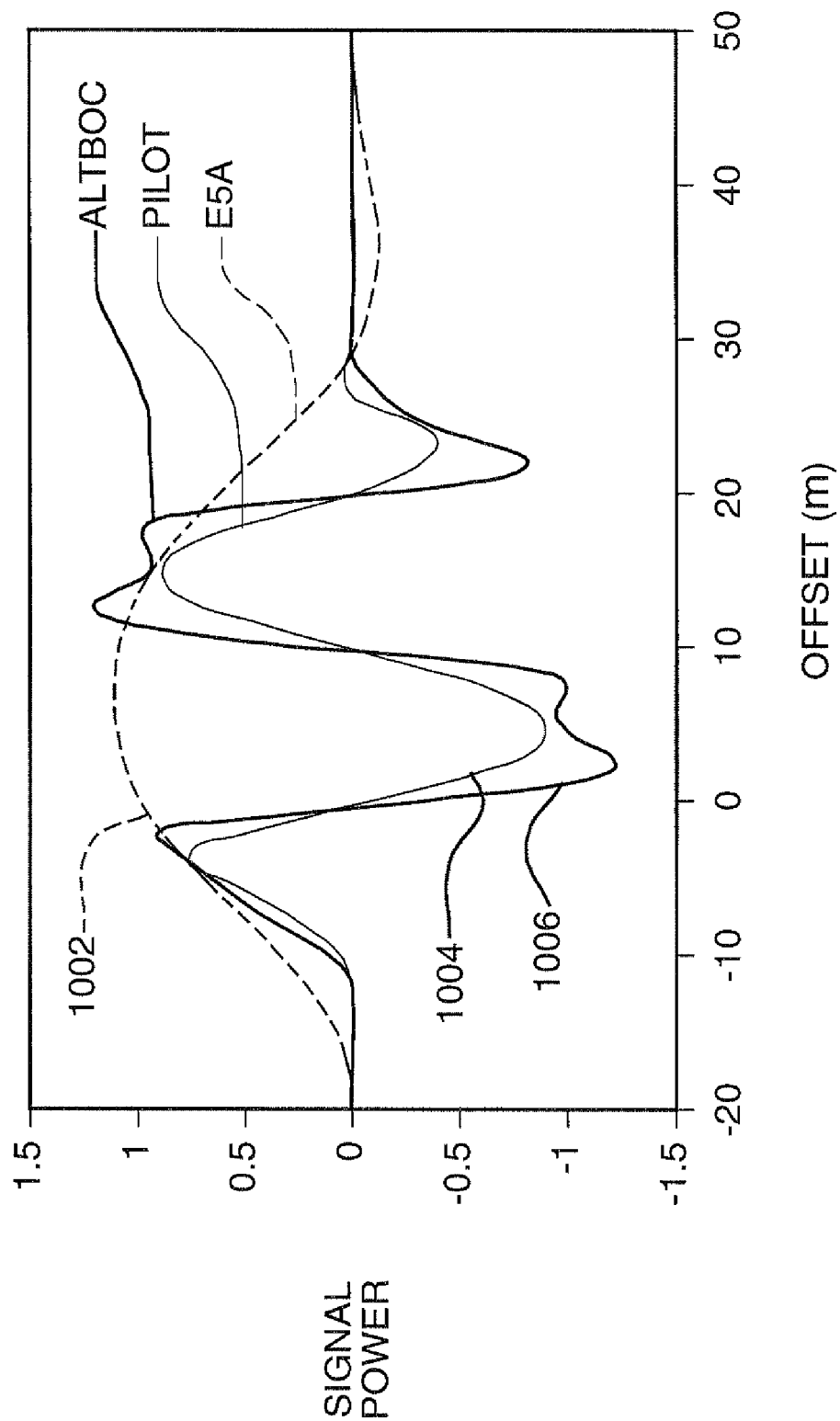
FIG. 11 illustrates pulse shapes of respective codes and code combinations.

FIG. 11 depicts the pulse shapes associated with tracking the individual codes, indicated by reference numeral 1002, the combined pilot codes, indicated by reference numeral 1004, and a combination of all four data and pilot codes, as indicated by reference numeral 1006. The pulse shape of the individual codes corresponds essentially to a sine wavelet. The pulse shape of the combined pilot codes provides observability of the 15 MHz splitting code, and thus, the pulses exhibit sharper transitions that are more accurately tracked than those of the individual codes. As illustrated, the combination of all 4 of the AltBoc codes has much more defined transitions, and thus, provides for even more accurate tracking by a receiver that utilizes the entire AltBoc signal.

Figure 12:
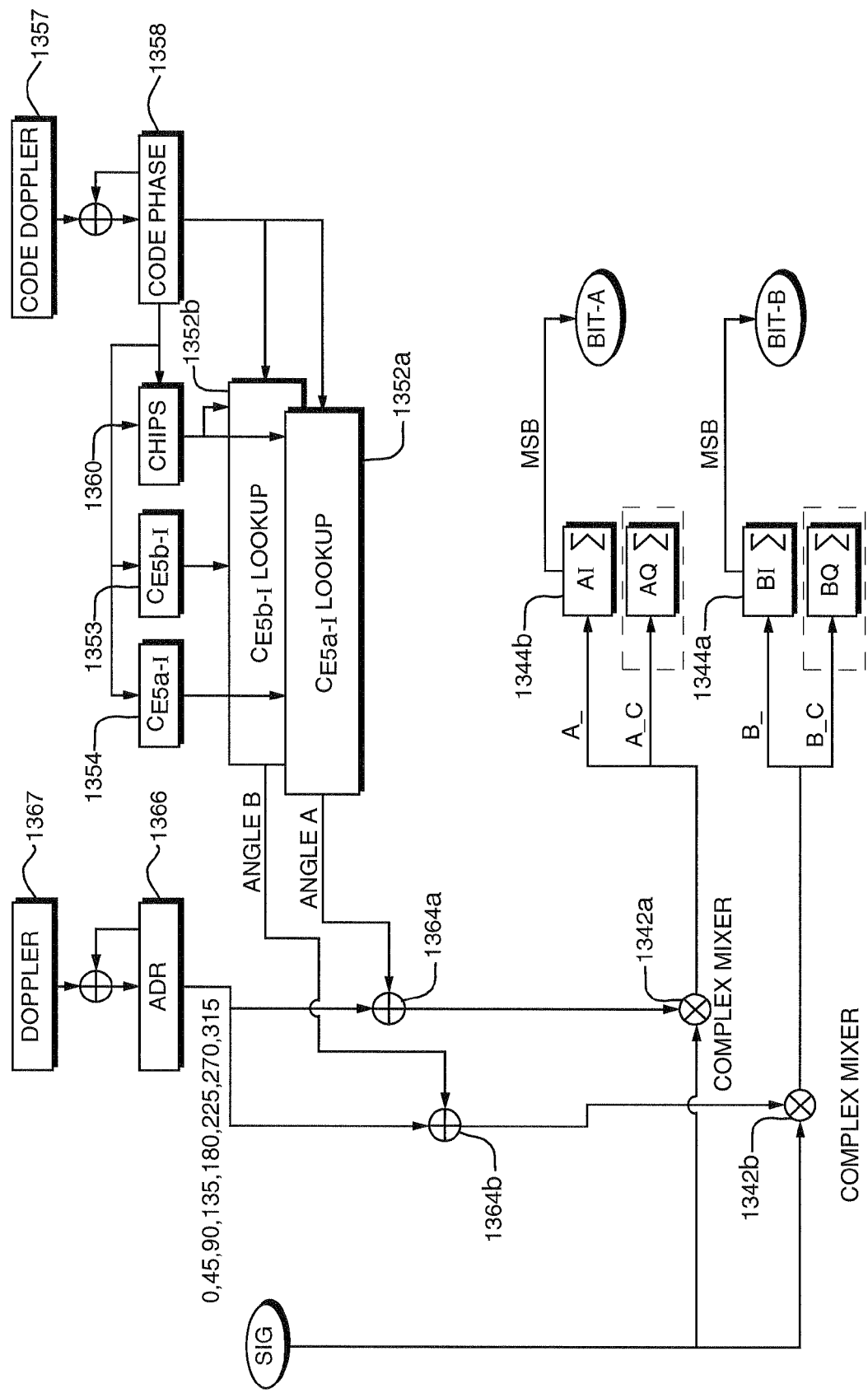
FIG. 12 is a diagram of an arrangement to simultaneously recover the data in the two data channels.

In order to track the 4-channel AltBoc signal with increased accuracy, the Nav data must be recovered from the E5a and E5b I channels. FIG. 12 depicts a circuit for recovering the Nav data in the two data channels. This circuit utilizes two lookup tables, 1352a and 1352b, (shown in FIGS. 13A and 13B), one for each of the $C_0$ and $C_1$ codes. The respective outputs of the lookup tables 1352a and 1352b are summed with the output of a carrier phase counter 1366 in summers 1364a and 1364b, and the resulting angles are multiplied by the incoming signal in complex mixers 1342a and 1342b. The outputs of the mixers are applied to punctual accumulators 1344a and 1344b. When the I signals have been acquired and tracked, the accumulators provide the data bits A and B that represent the recovered broadcast data $NAV_{E5a}$ and $NAV_{E5b}$ that were modulated onto the E5a and E5b I codes by the satellite. The $NAV_{E5a}$ bits are expected at a 50 Hz rate and the $NAV_{E5b}$ bits are expected at a 250 Hz rate. The Nav data are the sign bits of the respective accumulators, and the accumulation periods must be aligned with the respective bit boundaries. The A and B signals assume the correct ±1 values soon after the accumulation periods start, with the length of time for a signal to settle on the correct value depending on the signal to noise ratio in the channel. The accumulators lose power at the bit transitions in the data, however, the Nav data are readily tracked since the transitions are slow with respect to the transitions in the associated spreading codes.

It is assumed that the code and carrier Doppler registers 1357, 1358 and 1366, 1367 will be initialized and updated by a separate tracking of one or a combination of the pilot codes as described above with reference to FIG. 8. As noted above, once one of the PRN codes from a given satellite has been acquired and is being tracked, the other codes from the same satellite can be readily acquired and tracked since the code timing and carrier phase are very close for all of the codes transmitted by that satellite. This is particularly true when the tracking is for data recovery.

The values of the 12 time interval lookup tables utilized to recover the Nav data are rotated to provide maximum power in the I accumulators. Accordingly, as illustrated in FIGS. 13A and 13B, the values are rotated 22.5 degrees. Alternatively, the Doppler values may be offset. Optionally, Q accumulators for each of the A and B Nav data may be included in the arrangement of FIG. 12, to provide a further indication of power or to provide data demodulation during periods of non-coherent phase lock.

Figure 13:
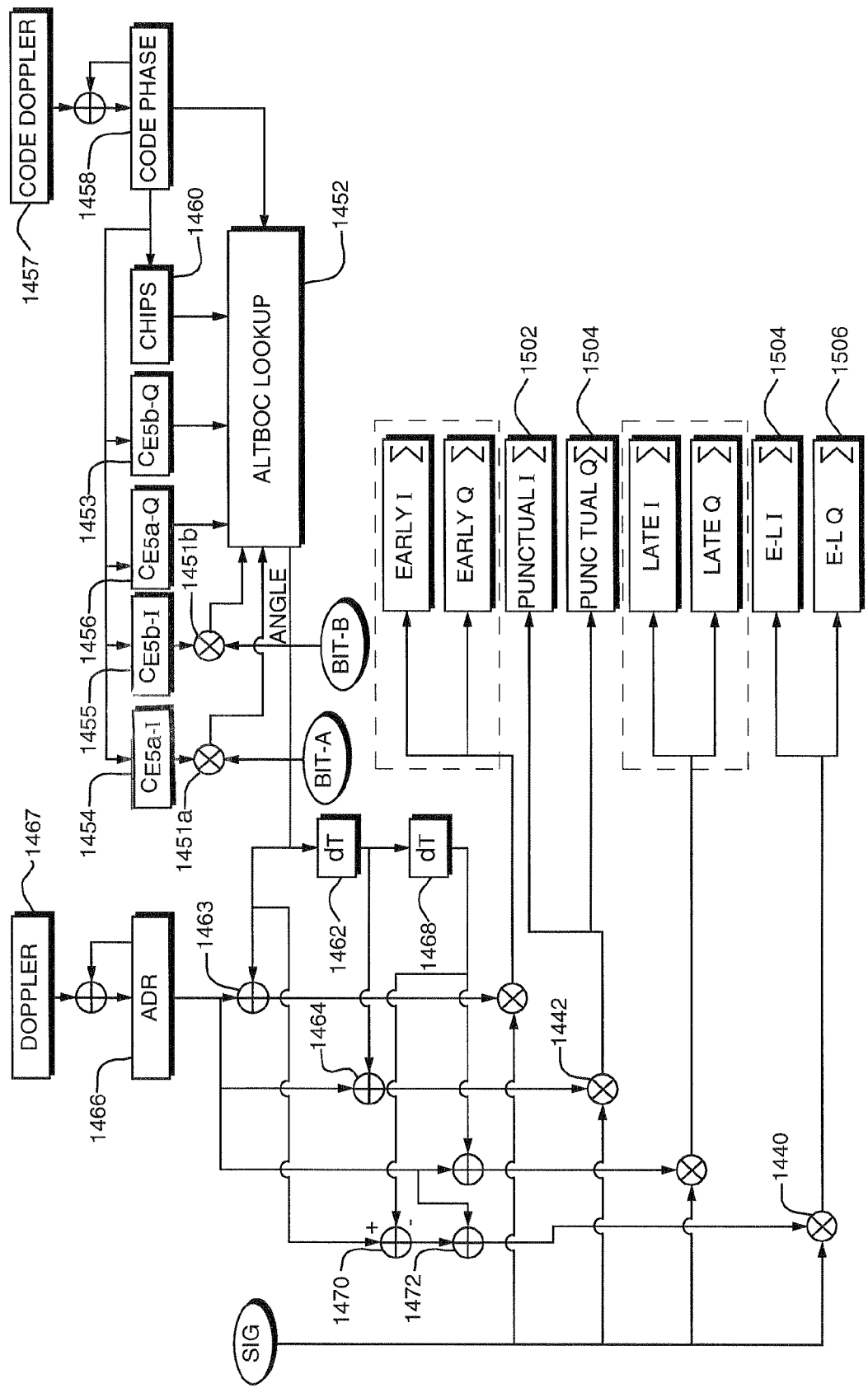
FIG. 13 depicts an arrangement that tracks the full AltBoc signal.

FIG. 13 depicts an arrangement that tracks the full AltBoc signal. Registers 1456 and 1453 apply the pilot codes $C_2$ and $C_3$ to an AltBoc lookup table 1452. The contents of registers 1454 and 1455 containing the codes $C_0$ and $C_2$ are also applied to the lookup table 1452 after multiplication in multipliers 1451a and 1451b by the Nav bits, that is, the A and B bits, respectively, which are provided from the circuit of FIG. 12. The angles from the table 1452 are passed through a group of adders, delay elements and mixers to punctual I and Q accumulators 1502 and 1504, and to Early-Late I and Q accumulators 1503 and 1506. Again, circuitry (not shown) performs the functions of using the outputs of the accumulators 1504 and 1506 to align and track the four codes, namely, $C_0$, $C_2$, $C_1$, $C_3$, simultaneously, based also on the relative timing of the respective codes at transmission. And, circuitry (not shown) performs the function of using the outputs of the punctual accumulators 1502, 1504 to maintain carrier phase lock onto the incoming signal by providing feedback to the ADR register 1466 with modifications to the Doppler rate register 1467 in a well known manner.

Figure 14:
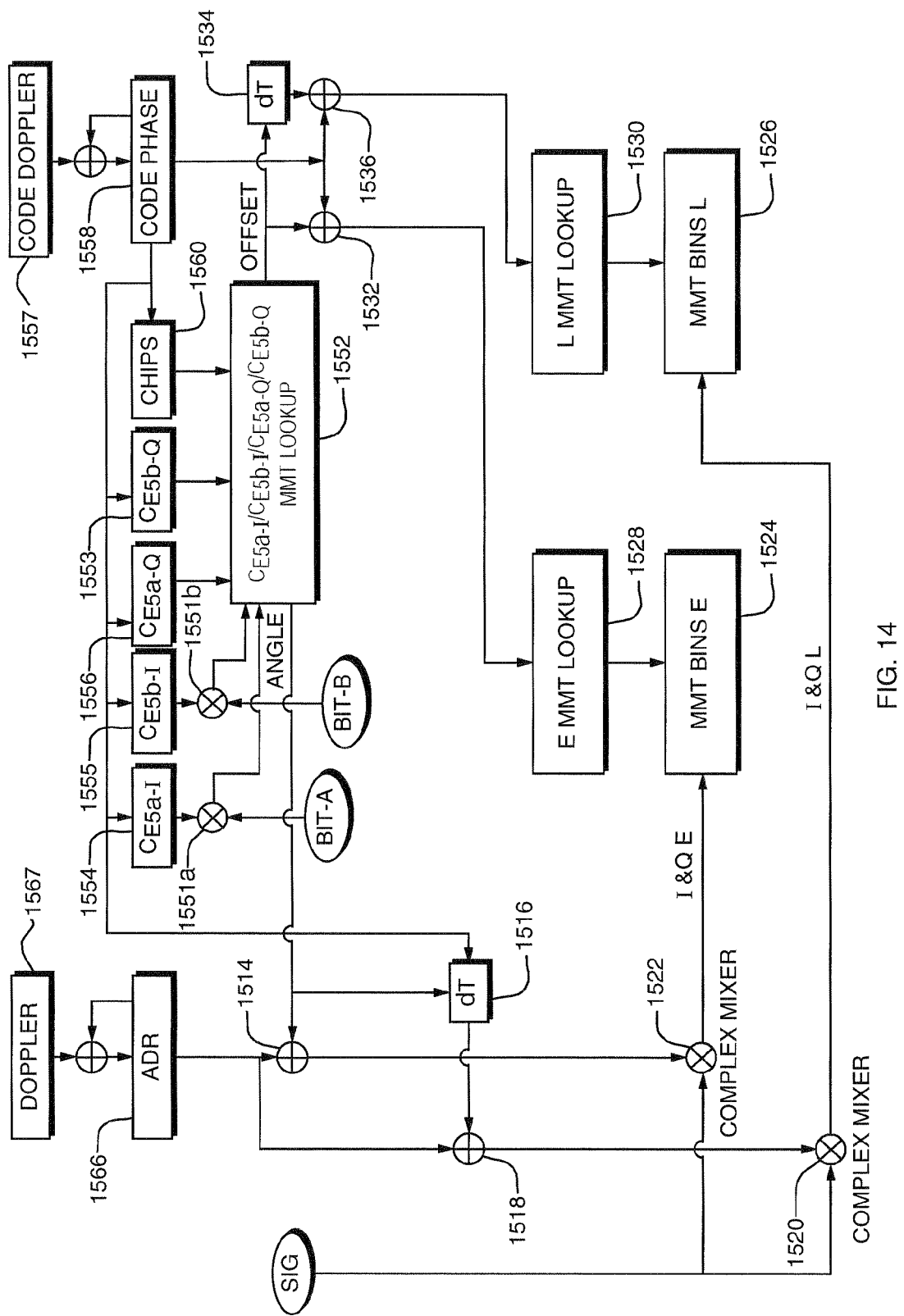
FIG. 14 is a diagram illustrating the application of a Multipath Mitigation Technique to a receiver tracking all four codes.

FIG. 14 illustrates a circuit that utilizes the measurement of the pulse shape of the AltBoc signal, and thus, the application of the MMT to the entire AltBoc signal.

In FIG. 14, the lookup table 1552 contains angles and offset values, as shown in FIG. 14A, that are used respectively to rotate the signal into the I plane and align the 15 MHz splitting code transitions for all the various codes. The twelve time intervals ($T_0 \ldots T_{11}$) that are used to produce the associated signals constitute 1.5 wavelengths of the splitting code and there may be up to a ±½ chip shift to the PRN code chip edges in order to align the splitting code transitions. Accordingly, the MMT processing of FIG. 14 determines the pulse shape over two PRN code chips, with the MMT decoders 1528 and 1530 controlling the MMT operation of the bins appropriately.

Specifically, the code phase from the counter 1558 is added to the offset value from the lookup table 1552 in an adder 1532 and the result is applied to the early MMT decoder 1528. The offset is also passed through a one-chip delay element 1534 and summed in an adder 1536 with the code phase from the counter 1558. The sum is applied to the late MMT decoder 1530.

Each of the decoders 1528 and 1530 translates its inputs into signals that trigger accumulators in the arrays 1524 and 1526 to record the power values from the two mixers 1520 and 1522. The receiver also includes a processor (not shown) that compares the AltBoc received pulse shapes of a two chip segment, as recorded in the bin arrays 1524 and 1526, with the expected shapes in the absence of multipath, which is expected to look like pulse shapes 1006 of FIG. 12. Based on the results of the comparison, the receiver computes the timing of at least the direct path signal and adjusts the timing of the locally generated carrier and code chips accordingly.

In addition, the input signal, (SIG FIGS. 13 & 14) could be delayed until near the end of the NAV bit periods so that the BIT-A and BIT-B signals are fully recovered before use. This additional process (not shown) would avoid the signal loss that will occur just after the bit transitions. In this case additional circuitry would also be required to align the BIT-A and BIT-B signals to the delayed AltBoc signal SIG in FIG. 13 or 14.

There are a number of suggested multipath mitigation arrangements described in United States Application Publication Serial No. 2004/0208236 which is incorporated herein by reference, and in U.S. patent application Ser. No. 11/520,353 entitled APPARATUS FOR AND METHOD OF CORRELATING TO RISING CHIP EDGES, which is also assigned to a common Assignee and is incorporated herein by reference in its entirety. These arrangements may be used in conjunction with the circuitry of FIG. 14, to produce and utilize the corresponding pulse shape measurements.

The receiver may utilize a different discriminator function for its correlation operations. For example, the receiver may utilize correlation measurements that correspond to multiple code phase delays in the E-L DLL, as described in U.S. Pat. No. 5,414,729, which is owned by a common Assignee and incorporated herein by reference. Alternatively, or in addition, the multiple code phase delays may correspond to regions near the transitions in the 15 MHz splitting code or, as appropriate, in one of the PRN codes, such that the correlation measurements taken immediately before and after the code transitions are accumulated, as described in U.S. Pat. No. 6,243,409, which is owned by a common Assignee and incorporated herein by reference.

The foregoing description has been limited to a specific embodiment of this invention. It will be apparent, however, that variations and modifications may be made to the invention, with the attainment of some or all of its advantages. For example, a phase inverter may be used with reduced size lookup tables, and/or the lookup tables may include polar coordinates. Further, certain or all of the methods and apparatus discussed above may be used with other synchronous multiple code signals and, in particular, other binary offset codes. Therefore, it is the object of the appended claims to cover all such variations and modifications as come within the true spirit and scope of the invention.

What is claimed is:

1. A receiver for processing transmitted synchronous multiple coded signals, the receiver including:
   A. a code generator that generates signals corresponding to one of the transmitted codes;
   B. multipliers that multiply the received signal by a combination of carrier phase angles and code phase angles of a compressed signal that includes the same code;
   C. accumulators that accumulate the products produced by the multipliers; and
   D. a processor that processes the accumulations produced by the accumulators and controls the phase of the code generator to align the generated code with the corresponding codes in the received signal.

2. The receiver of claim 1 wherein the code phase angles correspond to offset intervals that span a code chip of the code.

3. The receiver of claim 2 further including a lookup table that provides the code phase angles in response to a code chip count and an offset interval count.

4. The receiver of claim 3 wherein the lookup table includes entries that represent code phases at time intervals that represent fractions of a code chip.

5. The receiver of claim 1 further including decoders that selectively control the accumulators to accumulate power measurements that correspond to respective code chip ranges that are associated with at least one of the offset intervals.

6. The receiver of claim 1 wherein
   the accumulators further produce accumulated measurements from which data modulated onto the code can be determined, and
   the combination by which the multipliers multiply the received signal includes the data.

7. The receiver of claim 1 further including one or more additional code generators for one or more of the codes in the transmitted signal and wherein
   the multipliers use a combination in which the code phase angles are of compressed signals that include the same codes, and
   the processor processes the accumulations produced by the accumulators and controls the phase of the one or more additional code generators to align the generated codes with the corresponding codes in the received signal.

8. The receiver of claim 1 further including one or more additional code generators for one or more of the codes in the transmitted signal and wherein
   the multipliers use a combination in which the code phase angles are of compressed signals that include the same codes, and
   the processor processes the accumulations produced by the accumulators and controls the phase of the one or more additional code generators to align the generated codes with the corresponding codes in the received signal.

9. The receiver of claim 8 wherein the signal is an AltBoc signal and the codes are pilot codes.

10. The receiver of claim 8 wherein the signal is an AltBoc signal and the codes are $E5_a$ and $E5_b$ data codes.

11. The receiver of claim 10 wherein
    the accumulators further produce accumulated measurements from which data modulated onto the respective codes can be determined, and
    the combinations by which the multipliers multiply the received signal include the data.

12. The receiver of claim 11 wherein
    the data are included in the combinations after the respective data bits are fully recovered, and
    the multipliers multiply a delayed version of the received signal with the combination that includes the data.

13. The receiver of claim 12 wherein the data are combined at times that correspond to the ends of respective data bit periods.

14. The receiver of claim 8 wherein the signal is an AltBoc signal and the codes are $E5_a$ and $E5_b$ data and pilot codes.

15. The receiver of claim 14 wherein
    the accumulators further produce accumulated measurements from which data modulated onto the respective codes can be determined, and the combinations by which the multipliers multiply the received signal include the data.

16. The receiver of claim 1 further including a downconverter for downconverting the received signal before the received signal is provided to the multipliers.

17. A method of aligning a code generator to a code contained in a received signal that includes multiple codes on multiple channels, the method including:
   A. providing, at offset intervals that span a code chip of the code produced by the code generator, code phase angles that correspond to a compressed signal that includes the same code;
   B. combining the code phase angles, associated carrier phase angles and a downconverted received signal and accumulating the results; and
   C. adjusting the code generator based on the accumulated results.

18. The method of claim 17 further including selectively accumulating the results to correspond to respective code chip ranges that are associated with at least one of the offset intervals.

19. The method of claim 17 further including
   accumulating results from which data modulated onto the code can be determined, and
   including the data in the step of combining.

20. The method of claim 15 further including
   providing code phase angles that correspond to compressed signals that include additional codes of the multiple codes, and
   adjusting additional code generators based on the accumulated results.

21. The method of claim 20 further including selectively accumulating the results to correspond to respective code chip ranges that are associated with at least one of the offset intervals.

22. The method of claim 20 further including
   accumulating results from which data modulated onto the code can be determined, and
   including the data in the step of combining.

23. The method of claim 22 wherein the signal is an AltBoc signal and the codes are $E5_a$ and $E5_b$ data codes.

24. The method of claim 22 wherein the signal is an AltBoc signal and the codes are $E5_a$ and $E5_b$ data and pilot codes.

25. The method of claim 22 further including selectively accumulating the results to correspond to respective code chip ranges that are associated with at least one of the offset intervals.

26. The method of claim 22 further including
   combining the data at times in which respective data bits are fully recovered, and
   delaying the downconverted received signal included in the combination to correspond to the times at which the data are included.

27. The method of claim 26 further including combining the data at times that correspond to the ends of respective data bit periods.

* * * * *